US008638388B2

(12) United States Patent
Natsume (10) Patent No.: US 8,638,388 B2
(45) Date of Patent: Jan. 28, 2014

(54) LENS APPARATUS AND IMAGE PICKUP SYSTEM HAVING AN IMAGE ABERRATION CORRECTING FEATURE

(75) Inventor: Satoshi Natsume, Sagamihara (JP)

(73) Assignee: Canon Kabushiki Kaisha (JP)

( * ) Notice: Subject to any disclaimer, the term of this patent is extended or adjusted under 35 U.S.C. 154(b) by 487 days.

(21) Appl. No.: 12/855,998

(22) Filed: Aug. 13, 2010

(65) Prior Publication Data

US 2011/0037881 A1 Feb. 17, 2011

(30) Foreign Application Priority Data

Aug. 14, 2009 (JP) .................................. 2009-187903

(51) Int. Cl.
*H04N 5/225* (2006.01)
*H04N 5/262* (2006.01)
*H04N 5/217* (2011.01)

(52) U.S. Cl.
USPC ....... 348/360; 348/335; 348/240.99; 348/241

(58) Field of Classification Search
USPC ......... 348/335, 360, 222.1, 251, 241, 240.99, 348/240.3, 347
See application file for complete search history.

(56) References Cited

U.S. PATENT DOCUMENTS

| 5,227,832 A | 7/1993 | Kawasaki et al. |
| 2004/0150732 A1 | 8/2004 | Yamanaka |
| 2008/0007630 A1 | 1/2008 | Hara |
| 2008/0239099 A1* | 10/2008 | Abe ........................ 348/231.99 |
| 2008/0240709 A1* | 10/2008 | Nakamura .................... 396/529 |
| 2009/0009633 A1* | 1/2009 | Suto .............................. 348/241 |
| 2009/0052769 A1 | 2/2009 | Kang et al. |
| 2009/0167925 A1* | 7/2009 | Murata ......................... 348/345 |
| 2009/0202171 A1 | 8/2009 | Kasahara |
| 2009/0304277 A1 | 12/2009 | Murata |

FOREIGN PATENT DOCUMENTS

| JP | 04-190220 A | 7/1992 |
| JP | 2004-241991 A | 8/2004 |
| JP | 2006-135805 A | 5/2006 |
| JP | 2008-278463 A | 11/2008 |
| WO | 2008/096534 A1 | 8/2008 |

OTHER PUBLICATIONS

Extended European Search Report issued in corresponding European Application Patent No. 10172359.1 dated Feb. 28, 2011.
"Astrodon MonsterMOAG Thin Off-Axis Guider", Jul. 5, 2013, XP055070012.
European Search Report issued in European counterpart application No. EP10172359.1, dated Jul. 11, 2013.

* cited by examiner

*Primary Examiner* — Nhan T Tran
(74) *Attorney, Agent, or Firm* — Rossi, Kimms & McDowell LLP (57) ABSTRACT

The lens apparatus is detachably attachable to a camera apparatus. The lens apparatus includes an image taking optical system, a memory configured to store aberration correction data being used for image correction processing corresponding to aberration of the image taking optical system, the image correction processing being performed on an image captured by the camera apparatus through the image taking optical system, and a data sending part configured to send the aberration correction data to the camera apparatus. The data sending part is configured to select partial data that is part of the aberration correction data depending on one of a position and a state of an optical adjustment member included in the image taking optical system and information on an image pickup element provided in the camera apparatus, and to send the partial data to the camera apparatus.

10 Claims, 8 Drawing Sheets

IMAGE SIZE

2/3inch

1/2inch

LARGE NUMBER OF PIXELS

SMALL NUMBER OF PIXELS

LENS APPARATUS AND IMAGE PICKUP SYSTEM HAVING AN IMAGE ABERRATION CORRECTING FEATURE

BACKGROUND OF THE INVENTION

1. Field of the Invention

The present invention relates to a camera system capable of performing image correction processing corresponding to optical aberration of a lens apparatus.

2. Description of the Related Art

Image taking optical systems coupled to lens apparatuses generally suffer from optical aberration such as chromatic aberration and distortion. Images captured through such an image taking optical system include a deterioration component corresponding to the optical aberration.

Therefore, conventional camera systems calculate an optical aberration amount at an image pickup surface of a camera apparatus on which an object image is formed by the lens apparatus, and perform image correction processing (aberration correction processing) on a captured image based on the optical aberration amount so as to reduce the deterioration component.

Japanese Patent Laid-Open No. 2006-135805 discloses a camera apparatus that pre-stores data on optical aberration (aberration correction data) regarding a lens apparatus. The camera apparatus decides a correction amount to be used in image correction processing based on the aberration correction data and the parameters of an optical adjustment member such as a zoom lens, a focus lens and an iris provided in the lens apparatus.

However, there is an increasing number of types of lens apparatuses which are suitable for use in camera systems with interchangeable lenses. Therefore, it is difficult to prepare the aberration correction data for all of the lens apparatuses that are suitable for use in the camera apparatus. Furthermore, existing camera apparatuses will not have the aberration correction data for a newly produced lens apparatus, which is attachable to the existing camera apparatus. Therefore, the existing camera apparatus cannot perform image correction processing on an image captured using the newly available lens apparatus.

Thus, there is a possible method of addressing the aforementioned problem in which a lens apparatus stores aberration correction data relevant to that lens apparatus and sends the aberration correction data to the camera apparatus to which the lens apparatus is attached in order to enable the camera apparatus to use the aberration correction data in the image correction processing.

In this case, however, the lens apparatus is required to store the aberration correction data that can be used for various camera apparatuses having mutually different resolutions including a high resolution. The aberration correction data for the high resolution (high resolution aberration correction data) includes an extremely large amount of data, which must be stored in the lens apparatus.

Even when the lens apparatus is attached to a low resolution camera apparatus, whose resolution is lower than that corresponding to the high resolution aberration correction data, the lens apparatus is required to send the high resolution aberration correction data to the low resolution camera, which increases data communication load which is not desirable.

SUMMARY OF THE INVENTION

The present invention provides a lens apparatus capable of reducing data communication load when the lens apparatus sends aberration correction data to a camera apparatus, and a camera system including the lens apparatus.

The present invention provides as one aspect thereof a lens apparatus detachably attachable to a camera apparatus. The lens apparatus includes an image taking optical system, a memory configured to store aberration correction data being used for image correction processing corresponding to aberration of the image taking optical system, the image correction processing being performed on an image captured by the camera apparatus through the image taking optical system, and a data sending part configured to send the aberration correction data to the camera apparatus. The data sending part is configured to select partial data that is part of the aberration correction data depending on one of a position and a state of an optical adjustment member included in the image taking optical system and information on an image pickup element provided in the camera apparatus, and to send the partial data to the camera apparatus.

The present invention provides as another aspect thereof a camera system including a lens apparatus, and a camera apparatus to which the lens apparatus is detachably attachable. The lens apparatus includes an image taking optical system, a memory configured to store aberration correction data being used for image correction processing corresponding to aberration of the image taking optical system, and a data sending part configured to send the aberration correction data to the camera apparatus. The data sending part is configured to select partial data that is part of the aberration correction data depending on one of a position and a state of an optical adjustment member included in the image taking optical system and information on an image pickup element provided in the camera apparatus, and to send the partial data to the camera apparatus. The camera apparatus is configured to perform, by using the partial data received from the lens apparatus, the image correction processing on an image captured by the camera apparatus through the image taking optical system.

Other aspects of the present invention will be apparent from the embodiments described below with reference to the drawings.

DESCRIPTION OF THE PREFERRED EMBODIMENTS

Embodiments of the present invention will be described hereinafter with reference to the accompanying drawings.

[Embodiment 1]

Figure 1:
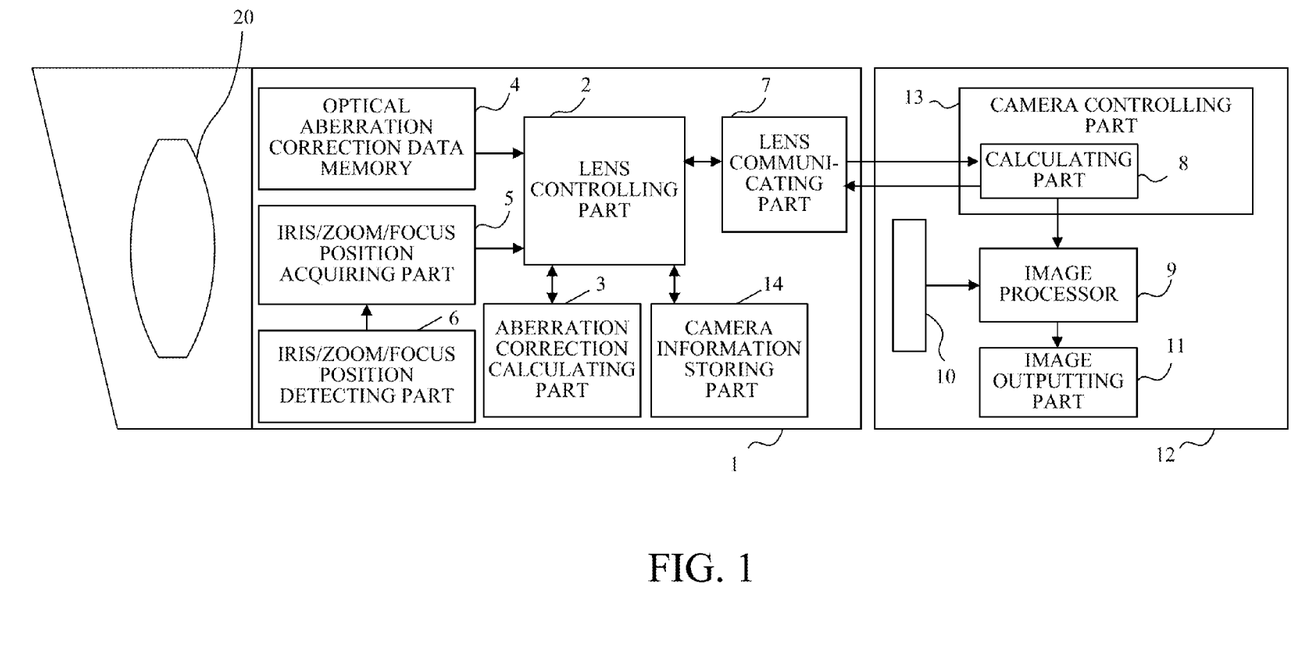
FIG. 1 is a block diagram showing a configuration of a camera system of embodiment 1 of the present invention.

FIG. 1 shows a configuration of a camera system that is a first embodiment (Embodiment 1) of the present invention. A lens apparatus 1 is detachably attachable to a camera apparatus 12.

The lens apparatus 1 is provided with an image taking optical system 20 including, though not shown, an iris, a zoom lens and a focus lens which are optical adjustment members, an iris/zoom/focus position acquiring part 5, a lens controlling part 2, an aberration correction calculating part 3, an optical aberration correction data memory 4 and a camera information storing part 14.

The iris/zoom/focus position acquiring part 5 is constituted by sensors each of which detects one of a position and a state of each of the iris, the zoom lens and the focus lens to output position information (or state information) thereof. The position or state of the iris can be detected as an aperture diameter of the iris, or a position of a member which is moved with changes of the aperture diameter of the iris. The position or state of the zoom lens can be detected as an actual position of the zoom lens, a position of a movable unit (lens unit or member) which is moved during zooming, or a command (signal) value for moving the movable unit, or a focal length of the entire lens apparatus in that state. The position or state of the focus lens can be detected as an actual position of the focus lens, a position of a movable unit (lens unit or member) which is moved during focusing, or a command value for moving the movable unit, or a distance to an object.

The lens controlling part 2 controls drive of the optical adjustment members, performs sending and receiving of data or information to and from the optical aberration correction data memory 4 and the iris/zoom/focus position acquiring part 5, and performs sending and receiving of data to and from the camera apparatus 12 through a lens communicating part 7.

The optical aberration correction data memory 4 is constituted by a nonvolatile memory, which stores a table of aberration correction data corresponding to optical aberration of the lens apparatus 1 (that is, of the image taking optical system). The table of aberration correction data is hereinafter referred to as the "aberration correction data table".

The aberration correction calculating part 3 selects partial data that is part of the aberration correction data table stored in the optical aberration correction data memory 4 depending on the position information (or state information) of each of the optical adjustment member input from the iris/zoom/focus position acquiring part 5. The lens controlling part 2 serving as a data sending part sends the selected partial data to the camera apparatus 12 through the lens communicating part 7.

The camera apparatus 12 is provided with a calculating part 8, an image processing part 9, an image pickup element 10, an image outputting part 11 and a camera controlling part 13.

The camera controlling part 13 performs various processing and various control in the camera apparatus 12, and communicates with the lens apparatus 1. Further, the camera controlling part 13 transfers the aberration correction data (partial data) received from the lens apparatus 1 to the image processing part 9.

The camera information storing part 14 stores information on the image pickup element 10 (the information on the image pickup element 10 corresponds to resolution information of the camera appartus 12, and hereinafter referred to as "camera information") such as an image size and an effective pixel number thereof, the camera information being obtained from the camera apparatus 12.

The image pickup element 10 photoelectrically converts an object image formed by the lens apparatus 1 (that is, by the image taking optical system 20) to output an image pickup signal. The image pickup signal is input to the image processing part 9.

The image processing part 9 performs various image processing on the image pickup signal to produce a captured image (captured video). Then, the image processing part 9 performs aberration correction processing on the captured image by using the aberration correction data received from the lens apparatus 1. The captured image subjected to the aberration correction processing is output to the image outputting part 11 as an output video signal.

Figure 2:
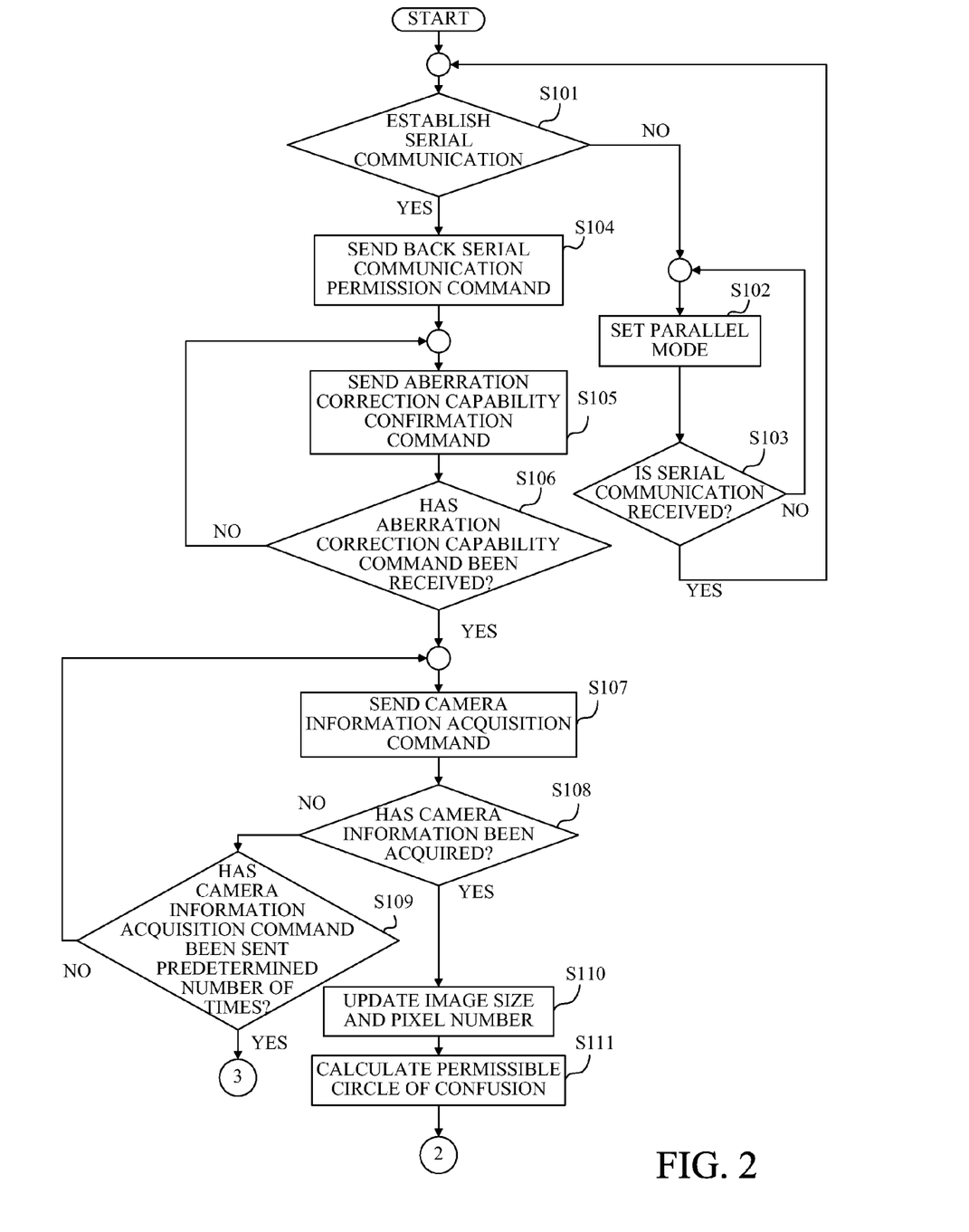
FIGS. 2, 3 and 4 show flowcharts of processing performed in the camera system of embodiment 1.
Figure 3:
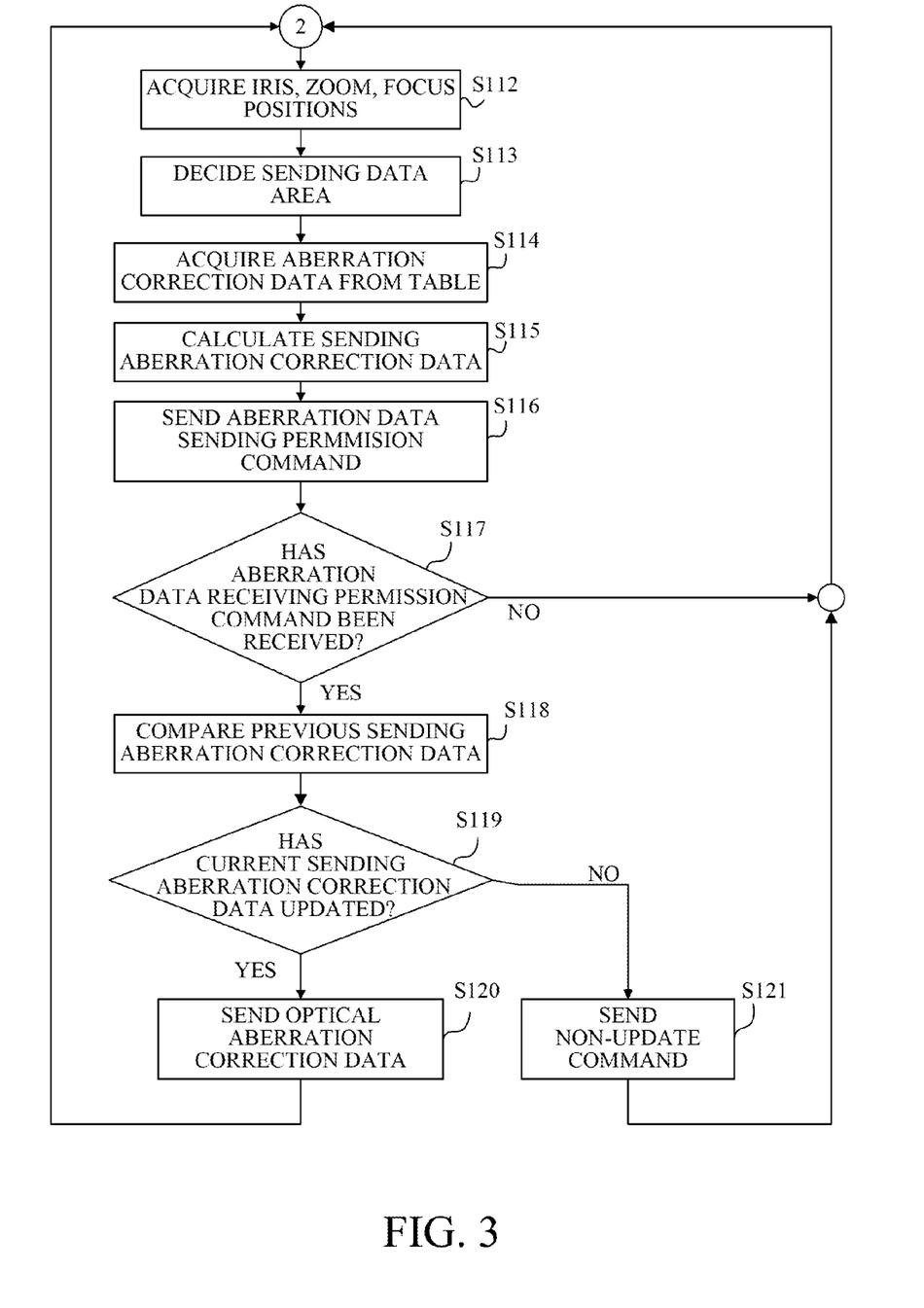
Figure 4:
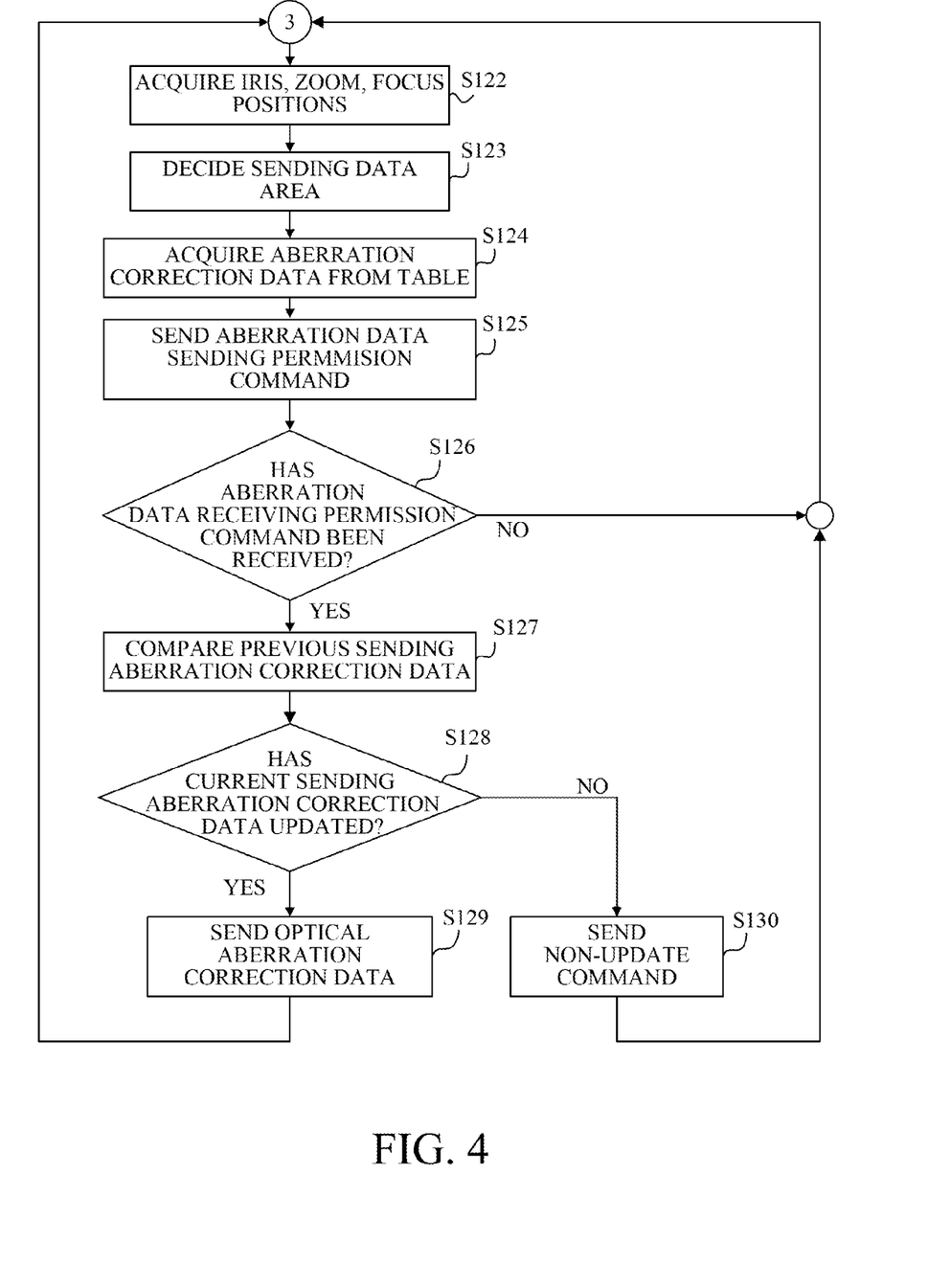

Flowcharts of FIGS. 2, 3 and 4 show a series of processing performed by the lens apparatus 1 (mainly by the lens controlling part 2).

In response to power-on of the camera system, the lens controlling part 2 at step S101 confirms whether or not serial communication with the camera apparatus 12 is established. Specifically, the lens controlling part 2 sends a serial interface command to the camera apparatus 12, and then determines that, if serial communication permission is sent back from the camera apparatus 12, the serial communication with the camera apparatus 12 is established.

If the serial communication with the camera apparatus 12 is established, the lens controlling part 2 proceeds to step S104 to send a serial communication permission command back to the camera apparatus 12, and then proceeds to step S105. If the serial communication with the camera apparatus 12 is not established, the lens controlling part 2 determines that the camera apparatus 12 has no serial communication function, and then proceeds to step S102.

At step S102, the lens controlling part 2 sets a communication interface with the camera apparatus 12 to a parallel mode to establish analog communication with the camera apparatus 12. Then, the lens controlling part 2 proceeds to step S103.

At step S103, the lens controlling part 2 waits for a serial interface confirmation command from the camera apparatus 12. When receiving the serial interface confirmation command, the lens controlling part 2 returns to step S101 and step S104 to send the serial communication permission command back to the camera apparatus 12, and then proceeds to step S105.

At step S105, the lens controlling part 2 sends an aberration correction capability confirmation command to the camera apparatus 12 to confirm whether or not the camera apparatus 12 is capable of performing the aberration correction processing.

Then, at step S106, the lens controlling part 2 determines whether having received an aberration correction capability command from the camera apparatus 12 or not. If having received the aberration correction capability command, the lens controlling part 2 proceeds to step S107. If having not received the aberration correction capability command, the lens controlling part 2 returns to step S105 to wait for receiving of the aberration correction capability command.

At step S107, the lens controlling part 2 sends a camera information acquisition command to the camera apparatus 12 to acquire the camera information such as the image size and the effective pixel numbers of the image pickup element 10 from the camera apparatus 12.

At step S108, the lens controlling part 2 confirms whether having acquired the camera information or not. If having acquired the camera information, the lens controlling part 2 proceeds to step S110. If having not acquired the camera information, the lens controlling part 2 proceeds to step S109. The lens controlling part 2 sends the camera information acquisition command to the camera apparatus 12 a predetermined plural number of times, and confirms the number of times of the sending of the camera information acquisition command at step S109. If the number of times of the sending of the camera information acquisition command is within the predetermined plural number of times, the lens controlling part 2 repeats step S107. If the number of times of the sending of the camera information acquisition command has reached the predetermined plural number of times, the lens controlling part 2 proceeds to step S122.

If having not acquired the camera information from the camera apparatus 12 even though the lens controlling part 2 has sent the camera information acquisition command the predetermined plural number of times, the lens controlling part 2 cannot determine performance (that is resolution or capacity) of the image pickup element 10 of the camera apparatus 12, and therefore sends the entire aberration correction data stored in the optical aberration correction data memory 4 to the camera apparatus 12.

At step S110, the lens controlling part 2 updates old camera information stored in the camera information storing part 14 with the newly acquired camera information.

Next, at step S111, the lens controlling part 2 calculates, on the basis of the acquired camera information, a permissible circle of confusion as a unit by which the camera apparatus 12 performs the aberration correction processing.

The permissible circle of confusion δ is calculated by the following expression where H and W represent a height and a width of the image size of the image pickup element 10, and N represents the effective pixel number thereof:

$$\delta^2 = (H \times W)/N.$$

In the aberration correction processing, it is necessary to use the permissible circle of confusion based on one pixel of the image pickup element 10 as one unit. For example, a permissible circle of confusion of an image pickup element with a diagonal size of ⅔ inches, an effective pixel number of 1.92 million and a square lattice pixel shape is as follows:

H=6.6 mm, W=8.8 mm and N=1920000

$$\delta^2 = (8.8 \times 6.6)/1920000$$

δ=5.5 μm.

Figure 5:
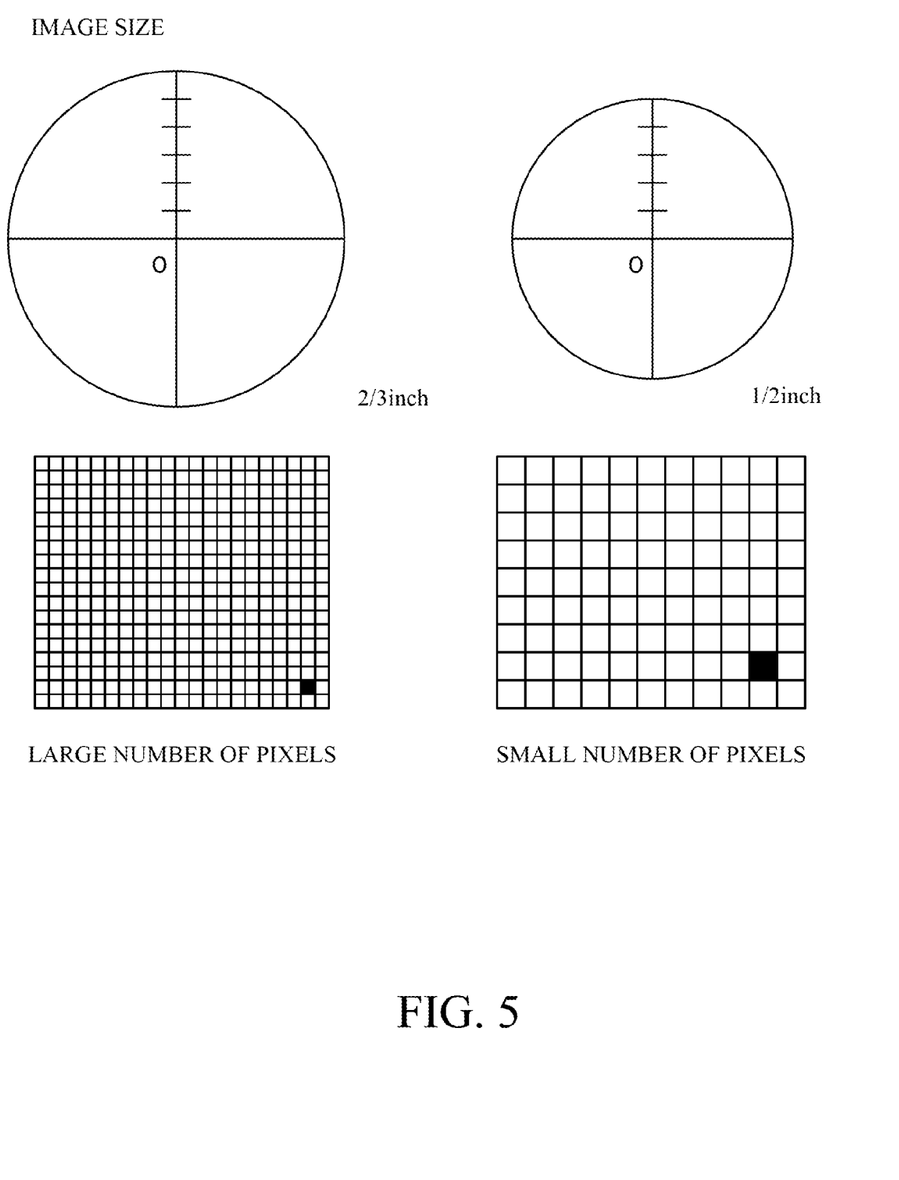
FIG. 5 shows an image size and pixels of an image pickup element in the camera system of embodiment 1.

As shown in FIG. 5, a difference in image size (such as ⅔ inches and ½ inches) or effective pixel number of the image pickup element 10 changes the unit of the aberration correction such as the size of one pixel and the number of pixels, which causes a difference in resolution or amount of the aberration correction data to be sent to the camera apparatus 12. Therefore, obtaining necessary accuracy of the aberration correction processing by calculating the permissible circle of confusion on the basis of the acquired camera information makes it possible that the lens controlling part 2 sends to the camera apparatus 12 the aberration correction data (partial data) appropriate for capacity or resolution of the camera apparatus 12.

In FIG. 3, at step S112, the lens controlling part 2 acquires the current position information of the iris, the zoom lens and the focus lens (hereinafter also referred to as the "iris position", "zoom position" and "focus position") in the lens apparatus 1 from the iris/zoom/focus position acquiring part 5.

Next, at step S113, the lens controlling part 2 calculates an image area in the image pickup element 10 of the camera apparatus 12 on the basis of the acquired position information (iris, zoom and focus positions), the image area being used for producing the captured image. Then, the lens controlling part 2 decides, according to the image area, an area of the aberration correction data (partial data) to be used for the aberration correction processing in the aberration correction data table stored in the optical aberration correction data memory 4, in other words, a data area to be sent to the camera apparatus 12. The data area to be sent to the camera apparatus 12 is hereinafter referred to as the "sending data area". It is desirable that the partial data to be first sent to the camera apparatus be data corresponding to the image area (image height) decided according to the position (or state) of the zoom lens among the entire aberration correction data. This partial data may be changed according to the position of the focus lens or the position of the iris.

Since the camera apparatus 12 performs the aberration correction processing in the image area of the image pickup element 10 which is used for producing the output captured image, only the aberration correction data corresponding to the image area is necessary. That is, the entire aberration correction data table is not necessary.

Figure 6:
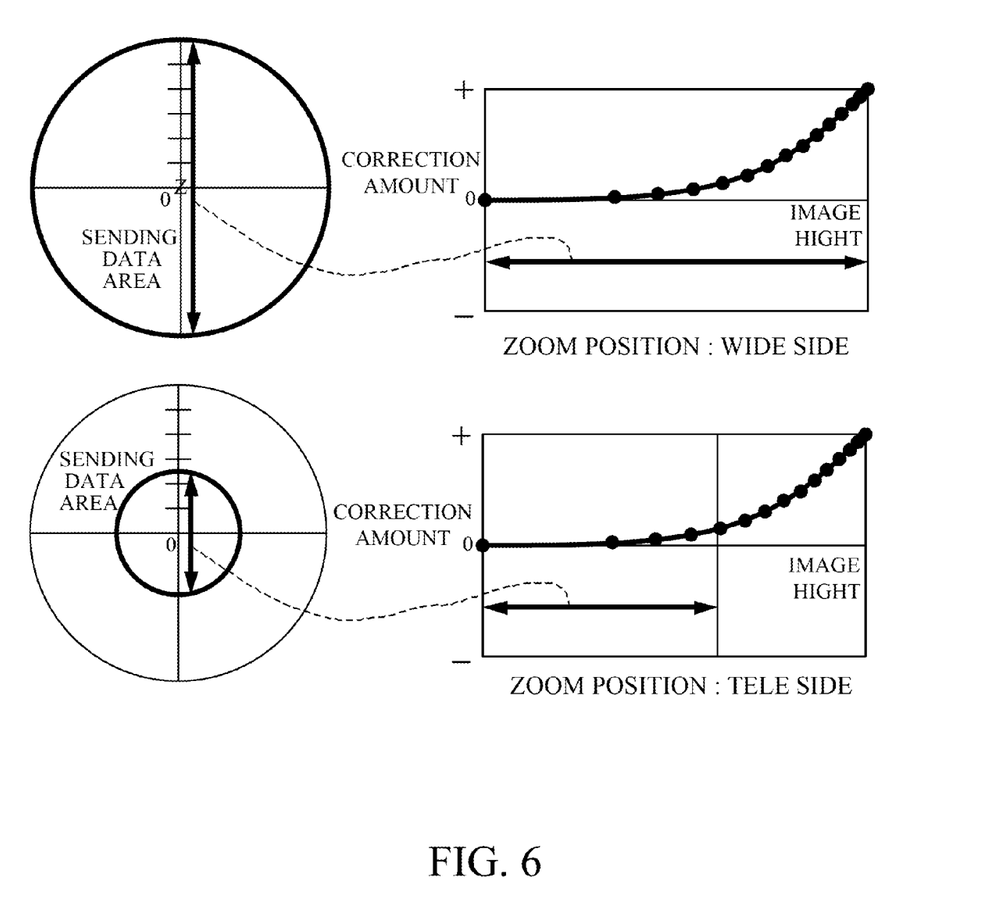
FIG. 6 shows a sending data area in the camera system of embodiment 1.

FIG. 6 shows a relationship between the zoom position and the sending data area. In a state where the iris position and the focus position are fixed, variation of the zoom position changes an area of the image pickup element 10 where the object image is projected from the lens apparatus 1. Since the size of the image area increases as the zoom position becomes closer to a wide-angle end, the size of the sending data area also increases. Since the size of the image area decreases as the zoom position becomes closer to a telephoto end, the size of the sending data area also decreases.

Then, at step S114, the lens controlling part acquires the aberration correction data in the sending data area decided at step S113 from the aberration correction data table stored in the optical aberration correction data memory 4.

Next, at step S115, the lens controlling part 2 calculates aberration correction data (hereinafter referred to as "sending aberration correction data") to be actually sent to the camera apparatus 12 on the basis of the aberration correction data in the sending data area and the permissible circle of confusion (or a length corresponding to two pixels of the image pickup element 10 provided in the camera apparatus 12) calculated at step S111.

Further, at step S116, the lens controlling part 2 sends an aberration data sending permission command to the camera apparatus 12. Then, at step S117, the lens controlling part 2 determines whether having received an aberration data receiving permission command from the camera apparatus 12 or not. If having not received the aberration data receiving permission command, the lens controlling part 2 returns to step S112. If having received the aberration data receiving permission command, the lens controlling part 2 proceeds to step S118 to compare the previous sending aberration correction data and the current sending aberration correction data. At step S119, if the current sending aberration correction data has not been updated from the previous sending aberration correction data, the lens controlling part 2 proceeds to step S121 to send a non-update command to the camera apparatus 12.

On the other hand, if the current sending aberration correction data has been updated from the previous sending aberration correction data, the lens controlling part 2 proceeds to step S120 to send to the camera apparatus 12 the sending aberration correction data by the permissible circle of confusion that is the unit of the aberration correction. Thereafter, the lens controlling part 2 returns to step S112.

The image processing part 9 of the camera apparatus 12 performs the aberration correction processing by using the received sending aberration correction data to output the captured image (video) subjected to the aberration correction processing through the image outputting part 11.

Further, at step S109, the lens controlling part 2 confirms the number of times of the sending of the camera information acquisition command, and proceeds to step S122 if the number of times of the sending of the camera information acquisition command has reached the predetermined plural number of times.

Since processes at step S122 to step S130 shown in FIG. 4 are almost the same as those at step S112 to step S121, description thereof is omitted.

As described above, in this embodiment, the lens controlling part 2 acquires from the camera apparatus 12 the camera information (such as the image size and the effective pixel number of the image pickup element 10) which is necessary for producing (selecting) the sending aberration correction data to be sent to the camera apparatus 12. Further, the lens controlling part 2 produces the sending aberration correction data appropriate for the camera apparatus 12 by using the position information of the optical adjustment members (the iris, zoom and focus positions) and the prestored aberration correction data table.

Moreover, the lens controlling part 2 decides the sending data area corresponding to the image area whose size is varied according to the iris, zoom and focus positions, and sends the aberration correction data in the sending data area to the camera apparatus 12. This makes it possible to prevent sending of unnecessary data from the lens apparatus 1 to the camera apparatus 12, which enables reduction of communication load between the lens apparatus 1 and the camera apparatus 12.

This embodiment has described the case where the lens apparatus 1 sends to the camera apparatus 12 the aberration correction capability confirmation command and the camera information acquisition command in order to confirm whether or not the camera apparatus 12 is capable of the aberration correction processing and in order to acquire the camera information. However, the camera apparatus may send to the lens apparatus, immediately after the establishment of the serial communication, information showing whether or not to perform the aberration correction processing and the camera information.

[Embodiment 2]

Next, description will be made of a camera system that is a second embodiment (Embodiment 2) of the present invention. Embodiment 1 has described the case where the lens controlling part 2 sends the aberration correction data by the permissible circle of confusion that is the unit of the aberration correction. In contrast thereto, in Embodiment 2, the lens controlling part 2 produces an approximate expression of aberration correction data corresponding to a distance (image height) from a center of an image circle, and sends this approximate expression (aberration correction approximate expression) to the camera apparatus 12.

The camera system of this embodiment has a same configuration as that of Embodiment 1. In this embodiment, components common to those in Embodiment 1 are denoted by the same reference numerals as those in Embodiment 1, and description thereof will be omitted.

Figure 7:
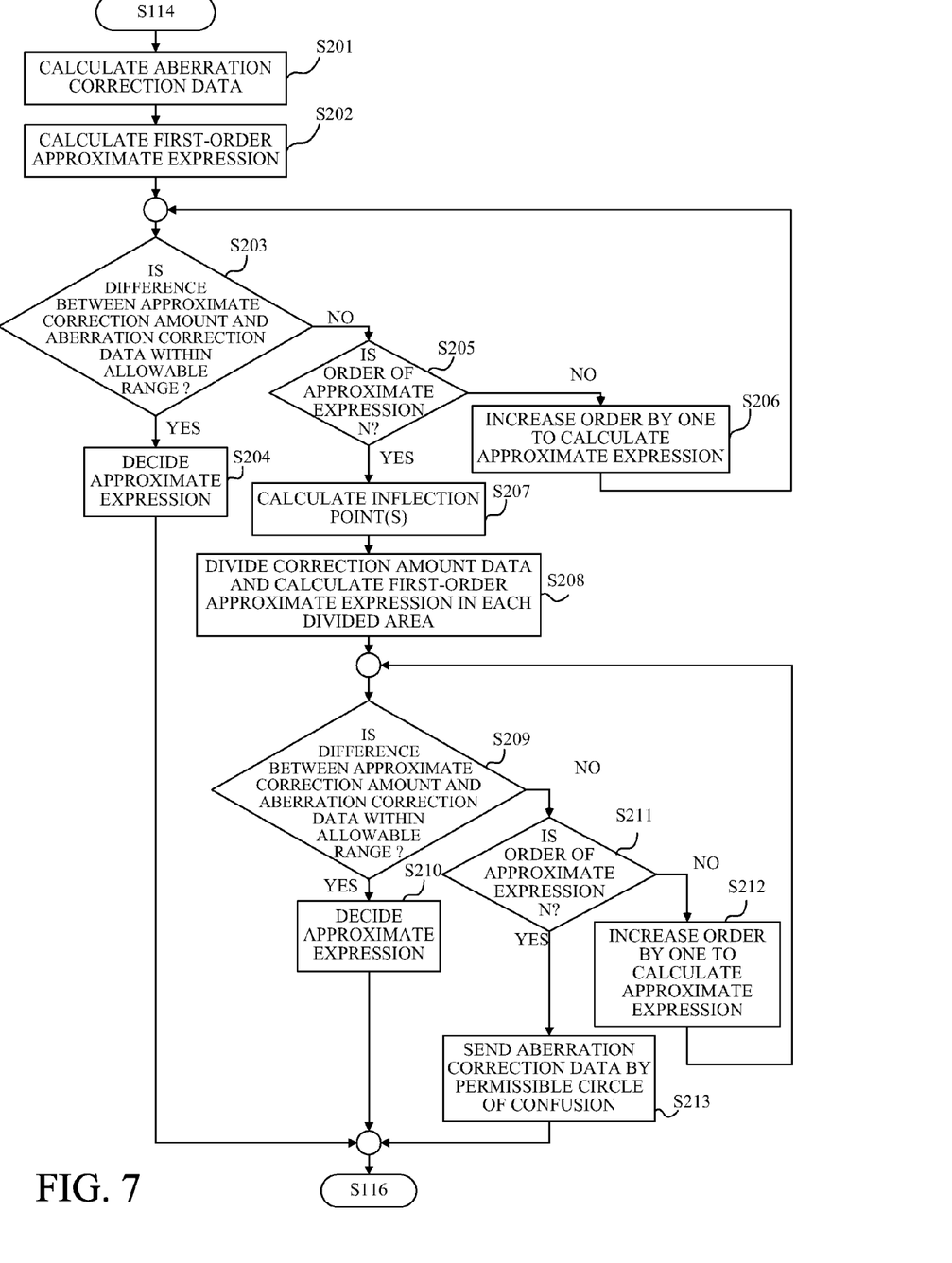
FIG. 7 shows a flowchart of processing performed in a camera system of embodiment 2 of the present invention.

A flowchart of FIG. 7 shows processing performed in this embodiment. Since this embodiment is characterized by a process of calculating data to be sent to the camera apparatus 12, which replaces step S115 in Embodiment 1, and description of the processes before and after the calculating process will be omitted.

At step S114, the lens controlling part 2 acquires the position information of the iris, the zoom lens and the focus lens (iris, zoom and focus positions) from the iris/zoom/focus position acquiring part 5. Then, the lens controlling part 2 acquires the aberration correction data of the sending data area necessary for the aberration correction processing on the basis of the position information, from the aberration correction data table stored in the optical aberration correction data memory 4.

Next, at step S201, the lens controlling part 2 calculates aberration correction data to be used for calculating the aberration correction approximate expression to be sent to the camera apparatus 12, from the aberration correction data acquired at step S114. In this calculation of the aberration correction approximate expression, the lens controlling part 2 defines the permissible circle of confusion calculated at step S111 as one unit of required resolution.

Next, at step S202, the lens controlling part 2 calculates a first-order approximate expression of the aberration correction data in the sending data area. Description of the calculation of the approximate expression will be made using FIG. 8.

Figure 8A:
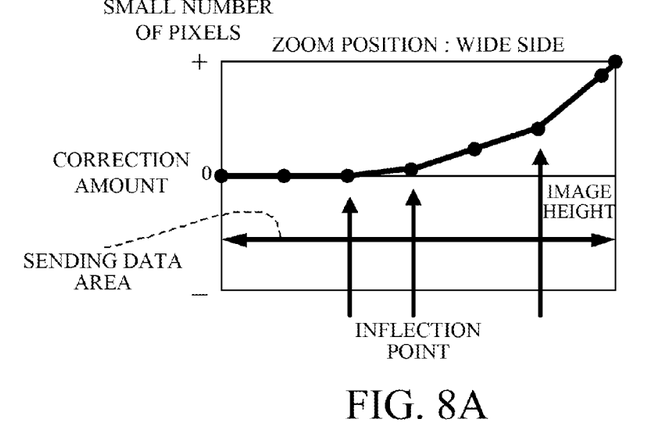
FIGS. 8A to 8C show aberration correction data in embodiment 2.
Figure 8B:
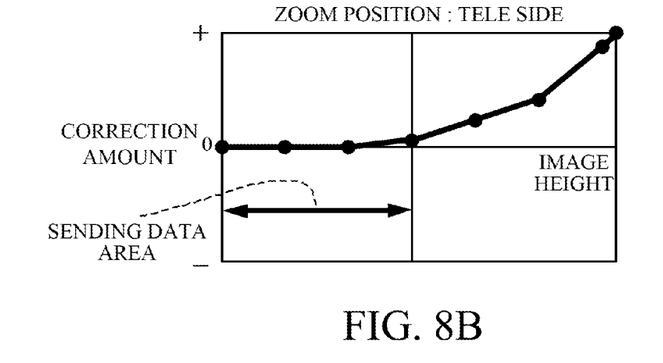
Figure 8C:
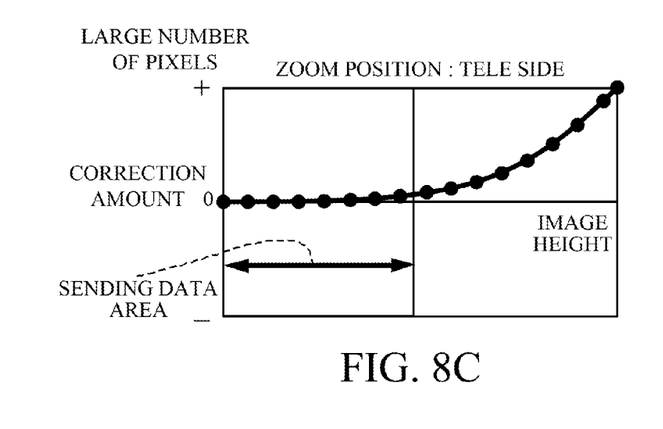

FIG. 8 plots aberration correction data elements of every unit of the required resolution as correction amounts (numerical values) set depending on the distance (image height) from the center of the image circle. Black circles in the figure show the correction amounts.

The sending data area necessary to be sent to the camera apparatus 12 is a data area which is calculated depending on the iris, zoom and focus positions and on the basis of which the aberration correction processing is performed in the camera apparatus 12. The lens controlling part 2 calculates data of the correction amounts in the sending data area as an approximate expression, with reference to the distance (image height) from the center of the image circle. The center of the image circle corresponds to an optical center of the image taking optical system 20.

When a pixel number is small, an amount of the aberration correction data to be sent to the camera apparatus 12 is normally small as shown in FIG. 8A. On the other hand, when the pixel number is large, the amount of the aberration correction data to be sent is also large as shown in FIG. 8C.

Further, the sending data area changes with the iris, zoom and focus positions. For example, as shown in FIG. 8B, when only the zoom position changes toward the telephoto end without changing of the iris and focus positions, the sending data area becomes narrower as compared with a case where the zoom position is in a wide-angle area as shown in FIG. 8A.

Thus, the amount of the aberration correction data to be sent to the camera apparatus 12 changes depending on a specification of the image pickup element 10 of the camera apparatus 12. Moreover, the sending data area changes depending on the iris, zoom and focus positions.

In this embodiment, the lens controlling part 2 increases the order of the approximate expression of the correction amounts from the first order, and then selects a most appropriate order approximate expression.

At step S202, the lens controlling part 2 first calculates a correction amount AB by using the following first-order approximate expression:

$$AB = ax + b \quad (1)$$

where a and b are coefficients, and x represents the image height.

At step S203, the lens controlling part 2 determines whether or not a difference at a same distance (image height) from the optical center between the correction amount calculated from the first-order approximate expression and the aberration correction data (data element) calculated from the aberration correction data table stored in the optical aberration correction data memory 4 is within an allowable range. The allowable range may be a dedicated allowable range for the lens apparatus 1 and the camera apparatus 12 or may be decided based on the captured image output after the aberration correction.

If the difference is within the allowable range, the lens controlling part 2 proceeds to step S204 to decide the above expression (1) as the approximate expression. Then, the lens controlling part 2 returns to step S116. If the difference is not within the allowable range, the lens controlling part 2 proceeds to step S205 to confirm whether or not the order of the approximate expression is N.

Although any order may be selected as the order of the approximate expression, when taking into consideration of a time required for calculation processing of the approximate expression by the lens controlling part 2 and a processing speed in the camera apparatus 12, it is desirable that the order thereof be up to about a third order.

If the order of the approximate expression is lower than N, the lens controlling part 2 proceeds to step S206 to increase the order of the approximate expression by one to a second order, and to calculate the correction amount by using the following second-order approximate expression:

$$AB = ax^2 + bx + c \quad (2)$$

where AB represents the correction amount, a, b and c are coefficients, and x represents the image height.

Then, returning to step S203, the lens controlling part 2 determines whether or not the difference between the correction amount calculated from the second-order approximate expression and the aberration correction data calculated from the aberration correction data table stored in the optical aberration correction data memory 4 is within the allowable range. If the difference is within the allowable range, the lens controlling part 2 proceeds to step S204 to decide the expression (2) as the approximate expression, and then returns to step S116.

If the order of the approximate expression is N, the lens controlling part 2 proceeds to step S207 to calculate at least one inflection point of the aberration correction data in the sending data area. The inflection point is a point where a slope of a straight line that connects the data elements of the correction amount changes as shown in FIG. 8A.

Next, at step S208, the lens controlling part 2 divides the correction amount data at each inflection point, and calculates the first-order approximate expression in each divided correction amount data area.

For example, in a case where the division number is two, the approximate expressions in the two correction amount data areas are as follows:

$$AB_1 = a_1 x + b_1 \quad (3)$$

$$AB_2 = a_2 x + b_2 \quad (4)$$

where $AB_1$ and $AB_2$ represent the correction amounts, $a_1$, $b_1$, $a_2$ and $b_2$ are coefficients, and x represents the image height.

Next, at step S209, the lens controlling part 2 determines whether or not the difference in each correction amount data area between the correction amount calculated from the above first-order approximate expression and the aberration correction data calculated from the aberration correction data table stored in the optical aberration correction data memory 4 is within the allowable range. If the difference is within the allowable range, the lens controlling part 2 proceeds to step S210 to decide the expressions (3) and (4) as the approximate expressions in the respective correction amount data areas, and then returns to step S116. If the difference is not within the allowable range, the lens controlling part 2 proceeds to step S211 to confirm whether or not the order of the approximate expression is N.

If the order of the approximate expression is lower than N, the lens controlling part 2 proceeds to step S212 to increase the order of the approximate expression by one, and to calculate the approximate expression again. For example, if the order of the approximate expression is increased to the second order, the following approximate expressions are calculated for the respective correction amount data areas:

$$AB_1 = a_1 x^2 + b_1 x + c_1 \quad (5)$$

$$AB_2 = a_2 x^2 + b_2 x + c_2 \quad (6)$$

where $AB_1$ and $AB_2$ represent the correction amounts, $a_1$, $b_1$, $c_1$, $a_2$, $b_2$ and $c_2$ are coefficients, and x represents the image height.

Then, returning to step S209, the lens controlling part 2 determines whether or not the difference in each correction amount data area between the correction amount calculated from the above second-order approximate expression and the aberration correction data calculated from the aberration correction data table stored in the optical aberration correction data memory 4 is within the allowable range. If the difference is within the allowable range, the lens controlling part 2 proceeds to step S210 to decide the expressions (5) and (6) as the approximate expressions in the respective correction amount data areas, and then returns to step S116. If the difference is not within the allowable range, the lens controlling part 2 proceeds to step S211.

It is not necessarily needed that the orders of the approximate expressions in the respective correction amount data areas are equal to each other, and the orders thereof may be decided appropriately for the respective correction amount data areas.

The lens controlling part 2 includes, when returning to step S116, the coefficients and order of the approximate expression thus decided into the aberration correction data to be sent to the camera apparatus 2.

If the order of the approximate expression is N at step S211, the lens controlling part 2 proceeds to step S213. At step S213, since the lens controlling part 2 could not decide the approximate expression in the allowable range, the lens controlling part 2 sets the aberration correction data to be sent to the camera apparatus 12 to data by the permissible circle of confusion. Then, the lens controlling part 2 returns to step S116.

As described above, in this embodiment, the lens controlling part 2 calculates the sending data area of the aberration correction data depending on the iris, zoom and focus positions in the lens apparatus 1, and produces the approximate expression of the aberration correction data corresponding to the distance (image height) from the center of the image circle. This enables further reduction of the data amount to be sent to the camera apparatus 2, which makes it possible to further reduce the communication load.

In the above-described embodiments, the partial data to be sent to the camera apparatus and to be used for the aberration correction processing is selected from the entire aberration correction data. Therefore, the sending of the unnecessary data from the lens apparatus to the camera apparatus can be prevented, which enables reduction of the communication load therebetween.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims the benefit of Japanese Patent Application No. 2009-187903, filed on Aug. 14, 2009, which is hereby incorporated by reference herein in its entirety.

What is claimed is:

1. A lens apparatus detachably attachable to a camera apparatus, the lens apparatus comprising:
    an image taking optical system;
    a memory configured to store aberration correction data being used for image correction processing corresponding to aberration of the image taking optical system, the image correction processing being performed on an image captured by the camera apparatus through the image taking optical system; and
    a data sending part configured to send the aberration correction data to the camera apparatus,
    wherein the data sending part is configured to:
    determine partial data that is part of the aberration correction data depending on at least one of (a) a position or a state of an optical adjustment member included in the image taking optical system or (b) information on an image pickup element provided in the camera apparatus, to calculate, in a case where the partial data includes a plurality of numerical values, an approximate expression of the plurality of numerical values;
    in a case where a difference between the approximate expression and the partial data is within an allowable range, send data including the approximate expression to the camera apparatus; and
    in a case where the difference between the approximate expression and the partial data is not within the allowable range, increase an order of the approximate expression.

2. A lens apparatus according to claim 1, wherein:
    the optical adjustment member includes a zoom lens that is moved during zooming, and
    the partial data is data produced according to a position or state of the zoom lens.

3. A lens apparatus according to claim 1, wherein the information on the image pickup element depending on which the partial data is selected is resolution information of the camera apparatus.

4. A lens apparatus according to claim 3, wherein the resolution information includes image area of the image produced by the image taking optical system and the effective pixel number on the image pickup element.

5. A lens apparatus according to claim 4, wherein only the aberration correction data corresponding to the image area is selected from the entire aberration correction data and sent to the camera apparatus.

6. A lens apparatus according to claim 1, wherein, when a difference between the partial data and the approximate expression whose order has been increased is within the allowable range, send data including the approximate expression whose order has been increased to the camera apparatus.

7. A camera system comprising:
    a lens apparatus; and
    a camera apparatus to which the lens apparatus is detachably attachable,
    wherein the lens apparatus comprises:
    an image taking optical system;
    a memory configured to store aberration correction data being used for image correction processing corresponding to aberration of the image taking optical system; and
    a data sending part configured to send the aberration correction data to the camera apparatus,
    wherein the data sending part is configured to:
    determine partial data that is part of the aberration correction data depending on at least one of (a) a position or a state of an optical adjustment member included in the image taking optical system or (b) information on an image pickup element provided in the camera apparatus, to calculate, in a case where the partial data includes a plurality of numerical values, an approximate expression of the plurality of numerical values;
    in a case where a difference between the approximate expression and the partial data is within an allowable range, send data including the approximate expression to the camera apparatus; and
    in a case where the difference between the approximate expression and the partial data is not within the allowable range, increase an order of the approximate expression, and
    wherein the camera apparatus is configured to perform, using the partial data received from the lens apparatus, the image correction processing on an image captured by the camera apparatus through the image taking optical system.

8. A lens apparatus according to claim 1, wherein the data sending part is further configured to:
    in a case where the difference between the approximate expression and the partial data is not within the allowable range and the order of the approximate expression is a predetermine value, divide the approximate expression at an inflection point, and determine whether a difference between the partial data and each of divided approximate expressions is within the allowable range;
    in a case where a difference between a divided approximate expression among the divided approximate expressions and the partial data is within an allowable range, send data including the divided approximate expression to the camera apparatus; and
    in a case where a difference between the divided approximate expression and the partial data is not within an allowable range, increase an order of the divided approximate expression and determine whether a difference between the partial data and the divided approximate expression whose order has been increased is within the allowable range, and when a difference between the partial data and the divided approximate expression whose the order has been increased is within the allowable range, send to the camera apparatus data including the divided approximate expressions in which the differences between the partial data and the divided approximate expressions whose order has been increased are within the allowable range.

9. A camera system according to claim 7, wherein the data sending part is further configured to:
    in a case where the difference between the approximate expression and the partial data is not within the allowable range and the order of the approximate expression is a predetermine value, divide the approximate expression at an inflection point, and determine whether a difference between the partial data and each of divided approximate expressions is within the allowable range;
    in a case where a difference between a divided approximate expression among the divided approximate expressions and the partial data is within an allowable range, send data including the divided approximate expression to the camera apparatus; and
    in a case where a difference between the divided approximate expression and the partial data is not within an allowable range, increase an order of the divided approximate expression and determine whether a difference between the partial data and the divided approximate expression whose order has been increased is within the allowable range, and when a difference between the partial data and the divided approximate expression whose the order has been increased is within the allowable range, send to the camera apparatus data including the divided approximate expressions in which the differences between the partial data and the divided approximate expressions whose order has been increased are within the allowable range.

10. A camera system according to claim 7, wherein, when a difference between the partial data and the approximate expression whose order has been increased is within the allowable range, send data including the approximate expression whose order has been increased to the camera apparatus.

* * * * *